United States Patent [19]

Kembo

[11] Patent Number: 4,879,666
[45] Date of Patent: Nov. 7, 1989

[54] INFORMATION OUTPUT DEVICE HAVING DATA BUFFER FOR PERFORMING BOTH CHARACTER POSITIONING AND CHARACTER EXPANSION/COMPRESSION

[75] Inventor: Nobumitsu Kembo, Hadano, Japan

[73] Assignee: Hitachi, Ltd., Tokyo, Japan

[21] Appl. No.: 49,937

[22] Filed: May 15, 1987

[30] Foreign Application Priority Data

May 19, 1986 [JP] Japan .................................. 61-114038
Jan. 20, 1987 [JP] Japan .................................. 62-10193

[51] Int. Cl.[4] ............................................ G06K 15/00
[52] U.S. Cl. .................................. 364/519; 364/518; 340/731; 340/735
[58] Field of Search ................ 364/518, 519; 340/748, 340/749, 750, 731, 735

[56] References Cited

U.S. PATENT DOCUMENTS

| | | | |
|---|---|---|---|
| 4,107,786 | 8/1978 | Masaki et al. | 340/749 X |
| 4,254,416 | 3/1981 | Lelke | 340/748 X |
| 4,271,476 | 6/1981 | Lotspiech | 340/727 X |
| 4,278,359 | 7/1981 | Weikel | 364/519 X |
| 4,284,989 | 8/1981 | Parsons | 340/748 X |
| 4,357,604 | 11/1982 | Imazeki et al. | 340/749 X |

Primary Examiner—Gary V. Harkcom
Assistant Examiner—Mark K. Zimmerman
Attorney, Agent, or Firm—Antonelli, Terry & Wands

[57] ABSTRACT

In an information output device, character data is read from a font memory and temporarily stored in a data buffer circuit and then dot-expanded to a full-dot memory. A data character is read from the font memory in units of a word and is written into a stage of the data buffer circuit while being laterally shifted so as to selectively position the character. The character is expanded or reduced by duplicating or eliminating the write operation for selected words at the time of reading the data from the data buffer circuit into the full-dot memory. Thus, the data buffer circuit operates to perform both the functions of character positioning and character expansion/compression.

6 Claims, 8 Drawing Sheets

INFORMATION OUTPUT DEVICE HAVING DATA BUFFER FOR PERFORMING BOTH CHARACTER POSITIONING AND CHARACTER EXPANSION/COMPRESSION

BACKGROUND OF THE INVENTION

1. FIELD OF THE INVENTION

The present invention relates to an information output device such as laser beam printer or display for outputting data such as characters, and more particularly to an information output device having a merge circuit used to dot-expand data such as characters read from a font memory in accordance with positions on a screen, etc.

2. DESCRIPTION OF THE RELATED ART

In the laser beam printer or display, data such as characters is read from the font memory which stores the data and this character data is dot-expanded to a full-dot memory having a one-page capacity or one-screen capacity, and the dot data of the full-dot memory is read to print or display the data.

In order to position the data at any position in the full-dot memory, a merge circuit is required.

In the prior art, in order to arrange the data read from the font memory at any position in the full-dot memory, a shifter, a mask circuit, a merge buffer and a synthesization buffer have been used in the merge circuit. Because a large quantity of hardware is required as well as a large control microprogram, a long time is required to process this data. This significantly affects the overall throughput of a video data terminal including printer and display.

For example, in a display device disclosed in JP-B-58-36781, a display control unit comprises a font memory, an address decoder for specifying an address to read font data from the font memory, a counter, an adder, a row selector, a column shifter and a shift register. As the address decoder specifies an address, required characters or graphic pattern data are selected from the memory and read. The row selector selects an output row to display the pattern read from the memory. The column shifter shifts one row of data of the pattern supplied from the row selector to the left or right by the specified amount and supplies it to the shift register. The shift register stores one row of pattern data, throws away as many bits as the amount of horizontal shift at the right end and adds as many "0" bits as the amount of horizontal shift to the left end.

SUMMARY OF THE INVENTION

It is an object of the present invention to provide an information output device which has a simplified merge circuit to reduce the amount of hardware, increase the processing speed and improve the performance of the device.

It is another object of the present invention to provide an information output device having a character expansion/reduction circuit which can parallelly and economically perform expansion/reduction and merging by a common circuit.

A buffer circuit which can convert the word direction and bit direction between the write mode and read mode is used as a merge buffer. When data is written into the merge buffer, characters are shifted and combined with the next characters. The content of the merge buffer is written into a full-dot memory. Thus, the merge speed is increased with less hardware.

In order to expand or reduce the characters, some words in the font memory are written into the character buffer in duplicate (expansion), while some words in the font memory are omitted in the write operation (reduction). In this manner, the characters can be expanded or reduced in the direction (longitudinal direction) crossing the word. Then, a bit sequence which is orthogonal to the written characters is read from the character buffer and written into the merge buffer. In the write operation, the word of the character buffer is written into the merge buffer in duplicate (expansion) or some words are omitted (reduction) so that the characters can be expanded or reduced in the direction (lateral direction) crossing the above direction. By shifting the write position in the character buffer to the left or right, merging to write the data into the full-dot memory is performed.

DESCRIPTION OF THE PREFERRED EMBODIMENTS

In an information output device such as a display device, information is handled in fixed units, for example, of a lateral word, to increase the processing speed. When the display device operates on a lateral word basis, the vertical position of a character may be shifted by word-by-word control, but the control of a horizontal position of the character is too coarse if it is controlled word by word. Accordingly, merging is required to merge adjacent characters to generate a word having a boundary at any desired position.

Figure 1:
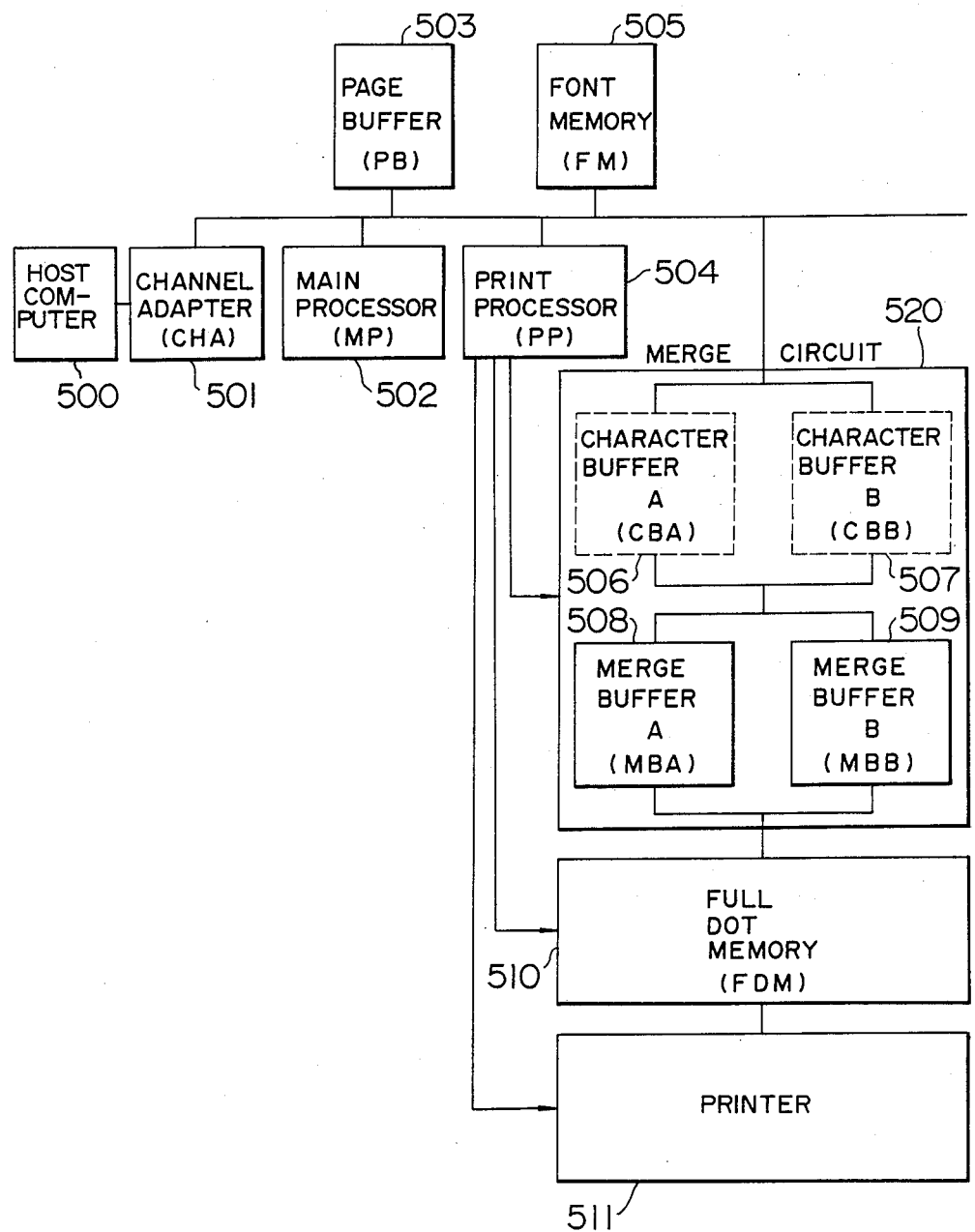
FIG. 1 shows a block diagram of an information output device in accordance with the present invention.

FIG. 1 shows a block diagram of the information output device. The information output device comprises a host computer 500, a channel adaptor 501, a main processor 502, a page buffer 503, a print processor 504, a font memory 505, character buffers 506 and 507, merge buffers 508 and 509, a full-dot memory 510 and a display device 511.

The data sent from the host computer is supplied to the main processor 502 through the channel adaptor 501. The main processor 502 edits the received data and temporarily stores the edited data into the page buffer 503. The character code from the host computer is decoded to an address of the font memory 505 and stored in the page buffer 503 together with other control information such as character position and size information. When one page of data has been written in the page buffer 503, the main processor 502 activates the print processor 504. The subsequent control is shifted to the print processor 504. The print processor 504 reads the address of the font memory 505 from the page buffer 503 to read the character pattern from the font memory 505. The character patterns are alternately stored in the character buffers 506 and 507 of the buffer circuit 520. The word directions of the character buffers 506 and 507 and the merge buffers 508 and 509 in the write mode and read mode are transverse to each other. The character patterns stored in the character buffers 506 and 507 are transferred to the merge buffers 508 and 509 with merge processes. In the write mode, the character buffers 506 and 507 and the merge buffers 508 and 509 operate to carry out expansion or reduction processing. The data stored in the merge buffers 508 and 509 are written into the full-dot memory 501. Then, the data written into the full-dot memory 510 is parallel-to-serial converted and sent to the printer or display device 511 such as a VDT. Also, the data in the font memory may be directly written into the merge buffer to eliminate need for the character buffer.

In the controller of FIG. 1, no separate expansion/reduction circuit or merge circuit is necessary, since these operations are also performed by the buffer circuit whose word directions in the write mode and read mode are transverse to each other. For example, data is read from the font memory 505 one lateral word at a time, and written into the character buffer 506 or 507 as a lateral word. When data is read from the character buffer 506 or 507, it is read one longitudinal word at a time, and written into the merge buffer 508 or 509 as a longitudinal word. In this manner, lateral shift is attained. Then, data is read from the merge buffer 508 or 509 one lateral word at a time, and written into the full-dot memory 510 as a lateral word. In this manner, lateral shift is attained without a shift circuit.

Figure 2:
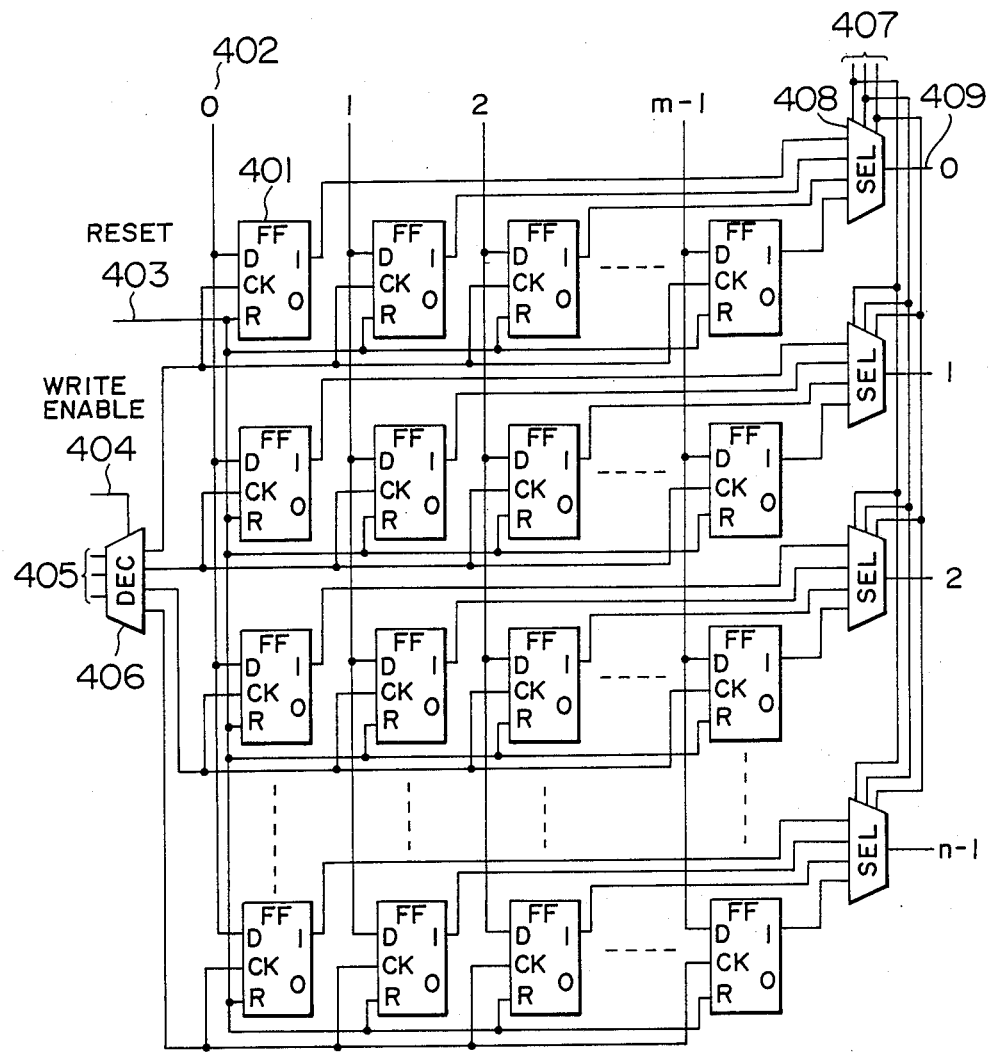
FIG. 2 shows a circuit diagram of a buffer circuit of FIG. 1, FIGS. 3 and 4 show examples of merging in a buffer circuit.

FIG. 2 shows an embodiment of a buffer circuit having transverse read and write directions.

In FIG. 2, registers (flip-flops) 401 are arranged m laterally and n longitudinally. For example, (m, n)=(32, 32). For expansion, (32, 64) or (64, 64) are used. Write data may consist of 4 bytes (32 bits). The number of registers in the lateral direction is 32 (m=32). The number of registers in the longitudinal direction is also 32 (n=32). The same input 402 is applied to data terminals D of the 32 longitudinal registers. A write address signal 405 is supplied to a decoder 406. A write enable signal 404 is supplied to an enable terminal of the decoder 406. Thirty-two output lines of the decoder 406 are provided one for each of the 32 longitudinal registers, and each output line is connected to clock terminals CK of the 32 registers on the lateral line. Outputs of the registers on each lateral line are supplied to a selector 408. Thirty-two selectors 408 are provided one for each of the 32 longitudinal registers of a respective lateral line, and the outputs thereof constitute read data 409. The read data is also of 4 bytes (32 bits) 00–31. The selection of the selectors 408 is specified by the address signal 407. When m=n=32, the write address signal 405 and the read address signal 407 are of 5 bits, respectively.

The write address signal 405 is decoded by the decoder 406 to select one of the decode outputs so that the write data 402 is stored in the 32 registers 401 on the corresponding lateral line. When the data is to be read, each selector 408 selects an output of one of the registers on the lateral line (for example, the third one) by the read address signal 407. Thus, the read data 409 is outputted from the 32 registers 401 on the longitudinal line. The write data 402 is written into the 32 registers on the lateral line specified by the write address signal 405, and the read data 409 is outputted from the 32 registers on the longitudinal line specified by the read address signal 407. By reversing the above relation, data may be written into the longitudinal line of registers and may be read from the lateral line of registers.

A reset signal 403 resets all registers 401. When characters are merged, there is no problem if characters are arranged without a space therebetween, but if there is a space between characters, the previous data must be erased, otherwise spurious data is printed or displayed. In such a case, if the registers 401 are all reset and then data is rewritten, a processing speed can be increased. The reset signal 403 is used in such a case.

In order to simplify the explanation, it is assumed that one bit of the data to be stored is stored in one register. This circuit may be readily implemented by conventional 4-bit registers. By using the 4-bit registers, the amount of hardware can be reduced. This circuit need not necessarily form a register array but may use a memory array having the same function. The scale of the buffer circuit may be reduced by a factor of two or four and processing may be carried out in a plurality of cycles, although the performance may be lowered.

Examples of merging by using the transverse write-read buffer shown in FIG. 2 will be explained with reference to FIGS. 3 and 4.

Figure 3:
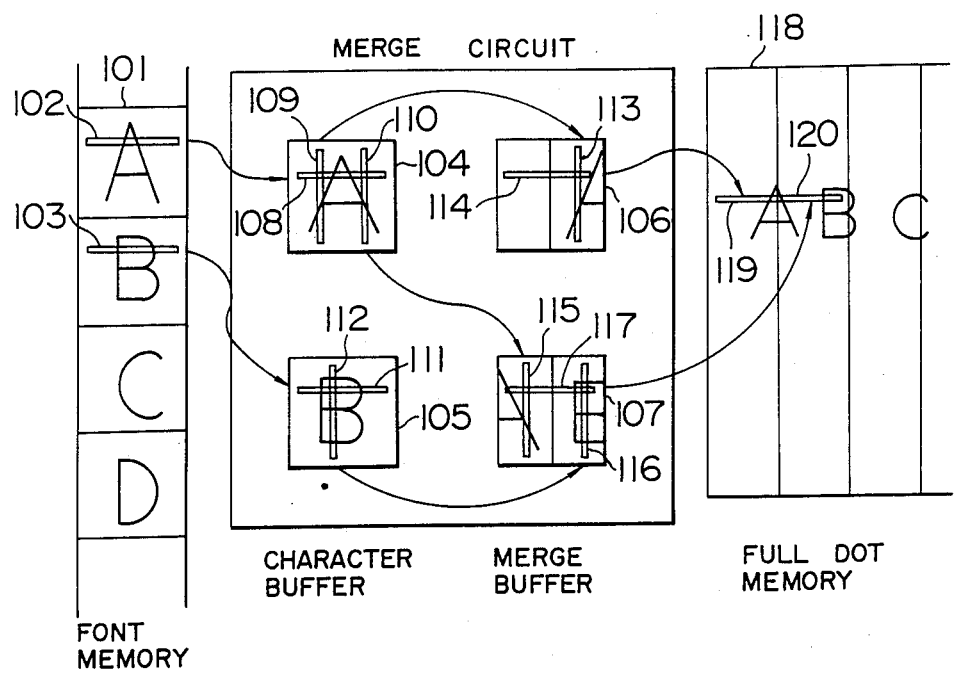

In the embodiment shown in FIG. 3, the merge circuit comprises character buffer 104 and 105, and merge buffers 106 and 107. The character buffers 104 and 105 are identical and alternately function as alternative buffers. The merge buffers 106 and 107 are also alternative buffers.

Let us assume that characters "A", "B" and "C" stored in the font memory 101 are to be written into the full-dot memory 118 with a lateral offset so that each character is located bridging two words of the full dot memory at least to some extent.

First, the character "A" is transferred from the font memory 101 to the character buffer 104, one word at a time. One word 102 of the font memory 101 is a lateral line of bits and it is moved to one lateral word 108 of the same number of bits in the character buffer 104. The number of bits in one word may be 32. When the characters of the font memory 101 are 32×32, 32×32-bit words are moved to complete one-character movement. After the character "A" has been moved to the character buffer 104, the left half of the character "A" is moved to the right half of the merge buffer 106. The data is now handled as a longitudinal line of bits. One longitudinal word 109 is read from the character buffer 104 and moved to the longitudinal word 113 of the merge buffer 106. Thus, the buffer 104 functions as a lateral-write, longitudinal-read buffer. By handling the word as a longitudinal word, any lateral shift may be attained. Thus, by merely changing the lateral write position of the merge buffer 106, a function of a conventional shifter circuit is attained. When a desired amount of a character has been stored in the merge buffer 106, data is shifted to the full-dot memory 118. The word of the full-dot memory 118 is laterally arranged. The lateral word 114 is read from the merge buffer 106 and it is written into the lateral word 119 of the full-dot memory 118. The merge buffer 106 is written longitudinally and read laterally. The directions of reading and writing are different from each other (orthogonal) in the buffers 104 and 106.

Soon after the writing to the merge buffer 106, the writing to the merge buffer 107 is started. The remaining right half of the character "A" is read one longitudinal word (110) at a time and written into the left half of the merge buffer 107 one longitudinal word (115) at a time. After the right half of the character "A" has been written into the left half of the merge buffer 107, the left half of the character "B" is written into the right half of the merge buffer 107. It is assumed that the character "B" has been written into the buffer 105 from the font memory 101. In this case, the lateral word 103 of the font memory 101 is moved into the lateral word 111 of the character buffer 105 one word at a time without position shift. The left half of the character "B" is moved from the character buffer 105 to the right half of the merge buffer 107. Namely, the longitudinal word 112 of the character buffer 105 is moved to the longitudinal word 116 of the merge buffer 107. Depending on the write position of the merge buffer 107, a space may be inserted between characters or characters may be overlapped. After the data transfer to the merge buffer 107 is completed and when the data transfer from the merge buffer 106 to the full-dot memory 118 is completed, the writing from the merge buffer 107 to the full-dot memory 118 is started.

In this manner, characters may be arranged at any position on the full-dot memory 118.

The character buffers 104 and 105 and the merge buffers 106 and 107 may be implemented by memories or register arrays whose read and write word directions are orthogonal to each other, such as the buffer shown in FIG. 2. Since such memories or register arrays operate sufficiently faster than the access time of the font memory or full-dot memory, the control circuit does not affect the system throughput.

Figure 4:
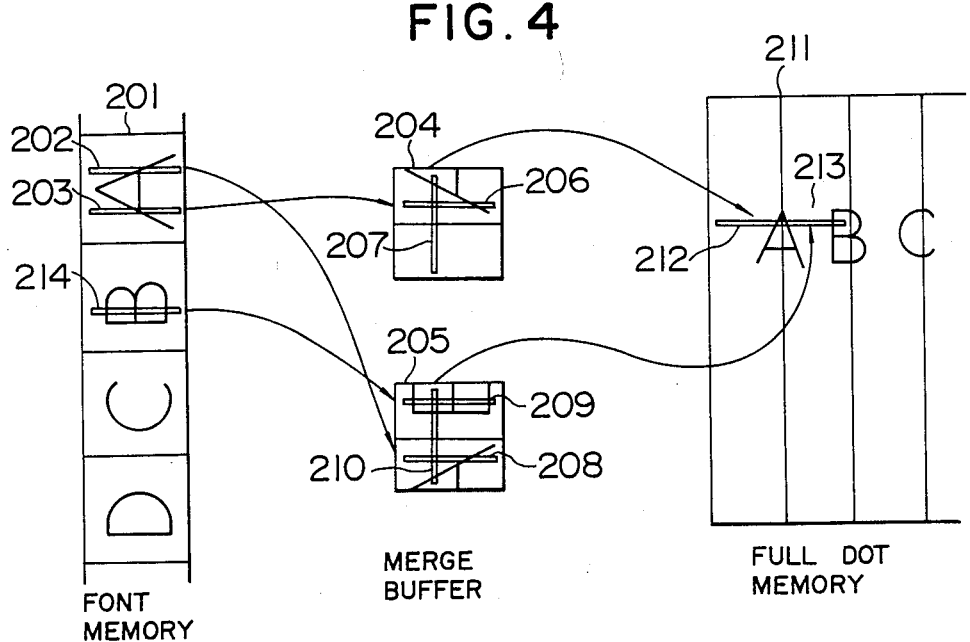

FIG. 4 shows an embodiment in which data is written into any position in the merge buffer from the font memory. The operation of this circuit is essentially the same as that of FIG. 1 except that the character buffers 104 and 105 of FIG. 1 are not necessary.

Data such as characters may be stored in the font memory 201 in a lateral line. Data of a lateral word 203 is read from the font memory 201 and written into a lateral word 206 of the merge buffer 204. Since the characters are in a lateral line in the font memory and character buffer, the character position may be longitudinally (laterally of characters) moved by selecting the read/write positions. When the left half of the character "A" has been written into the upper half of the merge buffer 204, a longitudinal word 207 of the merge buffer 204 is read and written into the full-dot memory 211 as a lateral word 212.

A merge buffer 205 is an alternative buffer with the merge buffer 204. Upon completion of writing to the merge buffer 204, the remaining data from the font memory 201 is read one word (202) at a time and written into the word 208 of the merge buffer 205. Thus, the remaining right half of the character "A" is stored in the lower half of the merge buffer 205. Then, the character "B" is read from the font memory 201 one lateral word (214) at a time and moved to a lateral word 209 of the merge buffer 205. When edition in the merge buffer 205 is completed and the writing from the merge buffer 204 to the full-dot memory 211 is completed, the longitudinal word 210 (lateral word for the character) of the merge buffer 205 is moved to the lateral word 213 of the full-dot memory 211.

In this manner, the embodiment of FIG. 4 attains the same operation and effect as that of FIG. 3.

An embodiment in which a merge operation and an expansion/reduction operation are carried out is explained with reference to FIGS. 5 and 6.

Figure 5:
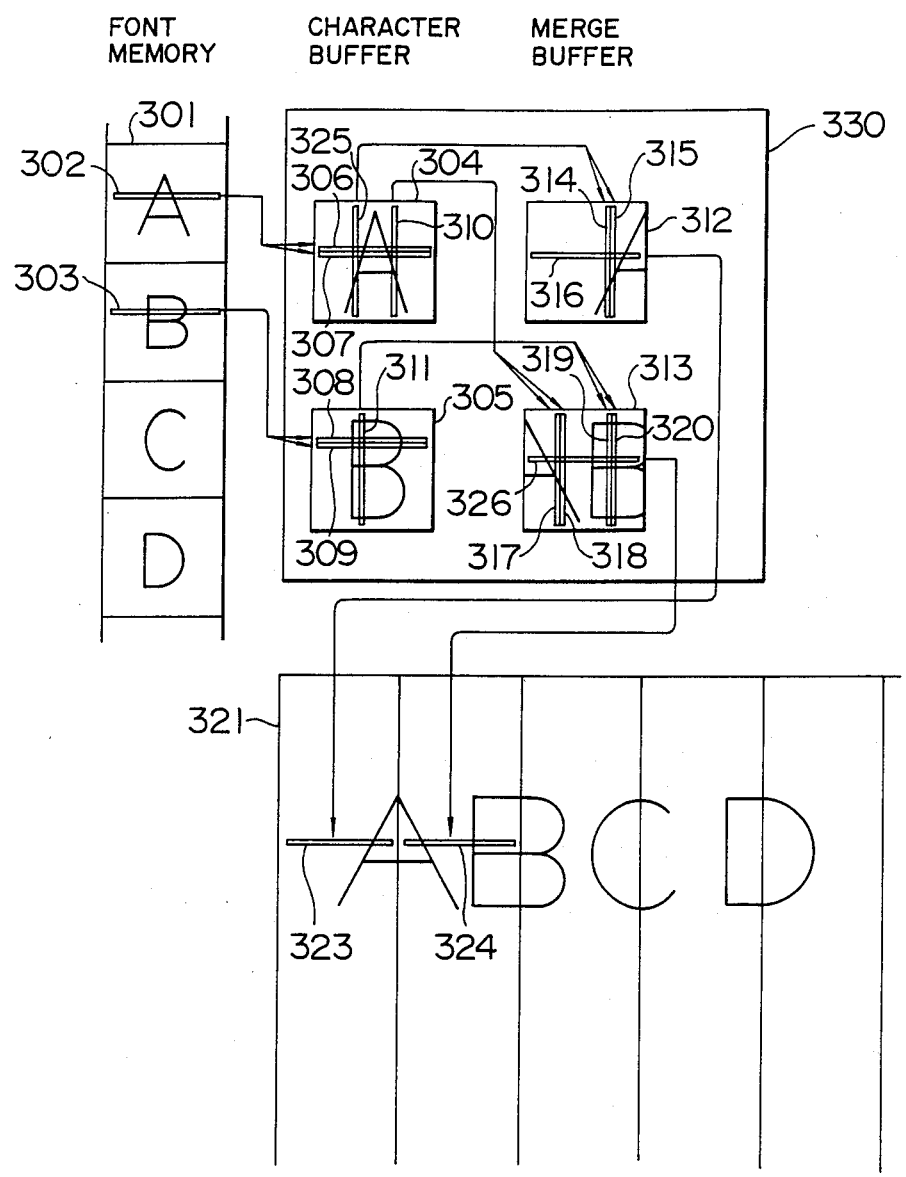
FIGS. 5 and 6 show block diagrams of embodiments for merging and expanding/reducing in the buffer circuit.

FIG. 5 illustrates a function of a character expansion/reduction circuit.

A font memory 301 stores 32×32-dots characters A, B, C and etc. It is assumed that the 32×32-dots character is longitudinally and laterally expanded by a factor of 2 to produce a 64×64-dots character and written into the full-dot memory 321 at any lateral position. The word length changes with the degree of expansion. For a lateral 32×longitudinal 64 character size, the word length is 32 dots lateral and 64 dots longitudinal.

A merge circuit 330 which carries out the expansion/reduction operation includes character buffers 304 and 305 and the merge buffers 312 and 313. The character buffers have a lateral 32 dots×longitudinal 64 dots size, and the merge buffers have a 64 dots×64 dots size. A 32×32 dots character buffer may be inserted between a 32×32 dot font memory and a 32×64 dot character buffer. The character buffers 304 and 305 are alternative buffers. The merge buffers 312 and 313 are also alternative buffers. The font memory 301 stores characters "A", "B", "C", "D" and etc. Each of words 302 and 303 of the font memory 301 is a lateral line of 32 bits. The character "A" is first moved from the font memory 301 to the character buffer 304. One word 102 of the font memory 301 is written into two words 306 and 307 of the character buffer 304. By writing each lateral word of the font memory 301 into the character buffer twice along the full longitudinal direction of the character, longitudinally doubly expanded characters are written.

Since the multiple-writing is not limited to two times but may be done any number of times, the character may be expanded by a factor of three or more. On the other hand, by partially eliminating a word in the font memory 301 and writing the result into the character buffer 304, the character can be reduced.

The longitudinally double-expanded character is then laterally double-expanded and it is shifted right and written into the merge buffer 112. The read word 325 which consists of a longitudinal 64 bits of the character buffer 304 is a longitudinally arranged bit line as shown, which crosses (is orthogonal) to the write words 305 and 307. The longitudinal word 325 of the character buffer 304 is shifted right on the merge buffer 312 and is written as longitudinal words 314 and 315. By writing each word twice along the lateral direction of the words stored in the character buffer 304, the character "A" is laterally double-expanded. In the illustrated example, it is shifted right so that the left half of the character "A" is stored in the merge buffer 312. The remaining right half of the character "A" is written into the left half of the other merge buffer 313. The word 325 is shifted and then written as words 317 and 318. While data is moved from the character buffer 304 to the merge buffer 312, the character "B" is moved from the font memory 301 to the character buffer 305. The word 303 of the font memory 301 is written into the words 308 and 309 of the character buffer 305 in duplicate so that the character "B" is longitudinally double-expanded. Then, the left half of the character "B" in the character buffer 305 is written into the right half of the merge buffer 313 with lateral double-expansion. This is attained by writing the read word 311 which consists of longitudinal 64 bits of the character buffer 305 into the words 119 and 120 of the merge buffer 313 in duplicate.

Data is then read, one lateral 64-bit word at a time, from the merge buffers 312 and 313 and written into the full-dot memory 321. Since the words 323 and 324 of the full-dot memory 321 are lateral bit lines, data is read from the merge buffers 312 and 313 as lateral words 316 and 326. The words 316 and 326 read from the merge buffers 312 and 313 cross (are orthogonal to) the write words 314, 315, 317, 318, 319 and 320. The character buffers 104 and 105 which are alternative buffers and the merge buffers 312 and 313 which are also alternative buffers may be identical, respectively.

In the present embodiment, the character is laterally and longitudinally double-expanded. By adding information to duplicate or eliminate particular columns or rows in the character and carrying out the expansion/reduction operation in accordance with the information, the expansion/reduction by a factor of a non-integer can be attained without degrading the character shape.

Figure 6:
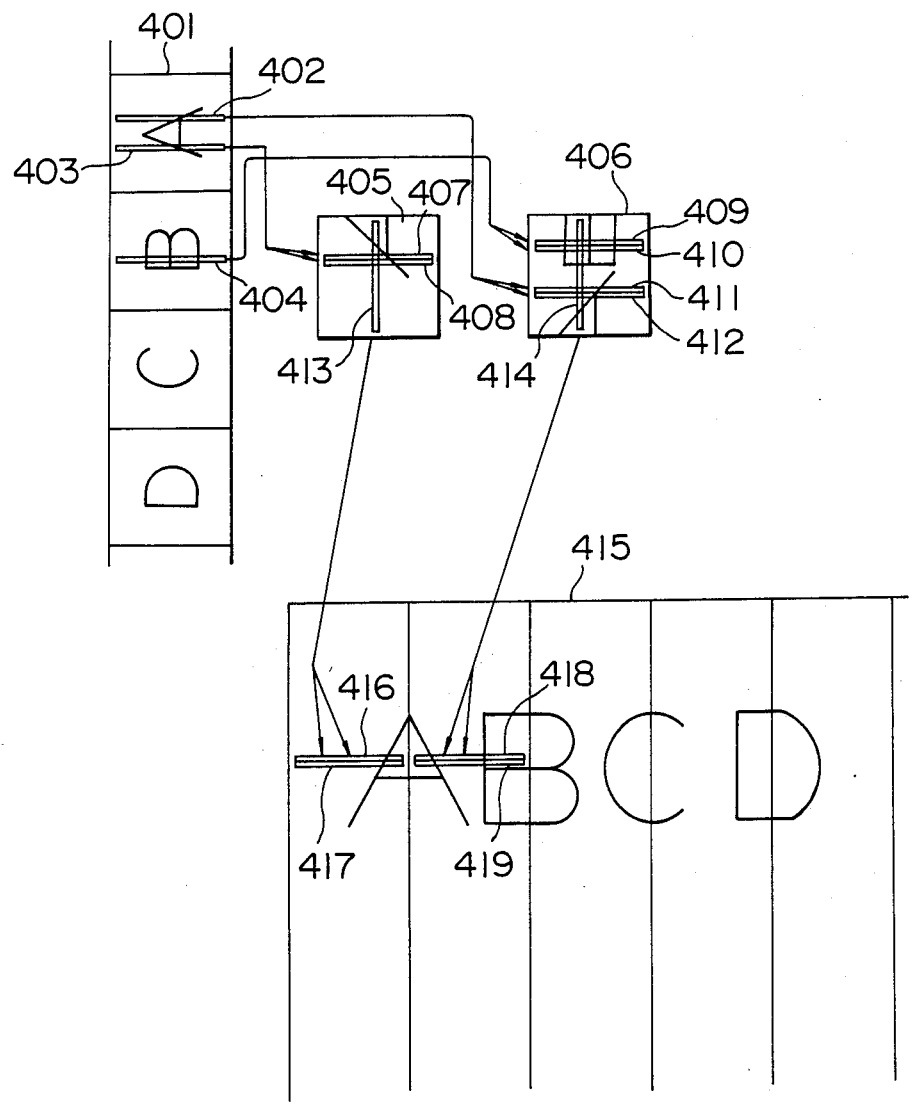

FIG. 6 illustrates a function of another embodiment of the character expansion/reduction circuit. In the present embodiment, characters "A", "B", "C" and "D" are double-expanded and each character bridges two words of the full-dot memory.

The embodiment of FIG. 6 differs from the embodiment of FIG. 5 in that:

(i) Characters are stored in the font memory 401 in lateral lines.
(ii) Character buffers are not necessary.
(iii) The character is longitudinally expanded when it is written from the merge buffer to the full-dot memory. In case of expansion from 32×32 dots to 64×64 dots, the size of merge buffer may be of 32×64 bits.

First, the character "A" is moved from the font memory 401 to the character buffer 405. The character "A" is double-expanded longitudinally of the buffer (laterally of the character) and it is shifted upward of the buffer (rightward of the character). This is attained by duplicating the word 403 in the left half of the character "A" in the merge buffer 405, shifting it upward, and writing it as words 407 and 408. The word 402 in the right half of the character "A" is written into the lower portion of the merge buffer 406 as words 411 and 412. Similarly, the word 404 in the left half of the character "B" is written into the upper portion of the merge buffer 406 as words 409 and 410 in duplicate. The lateral expansion and merging are performed in the merge buffer.

Then, data is read from the merge buffers 405 and 406 and written into the full-dot memory 415. Since the words 416, 417, 418 and 419 of the full-dot memory 415 are lateral bit lines, longitudinal words 413 and 414 are read from the merge buffers 405 and 406 and written as lateral words. By writing the words 413 and 414 into the full-dot memory 415 as duplicate words 416, 417 and 418, 419, respectively, the character is longitudinally double-expanded.

Then, the right half of the character "B" is written into the lower portion of the merge buffer 405. The left half and right half of the character are written by using two merge buffers, and they are written into the full-dot memory.

Figure 7:
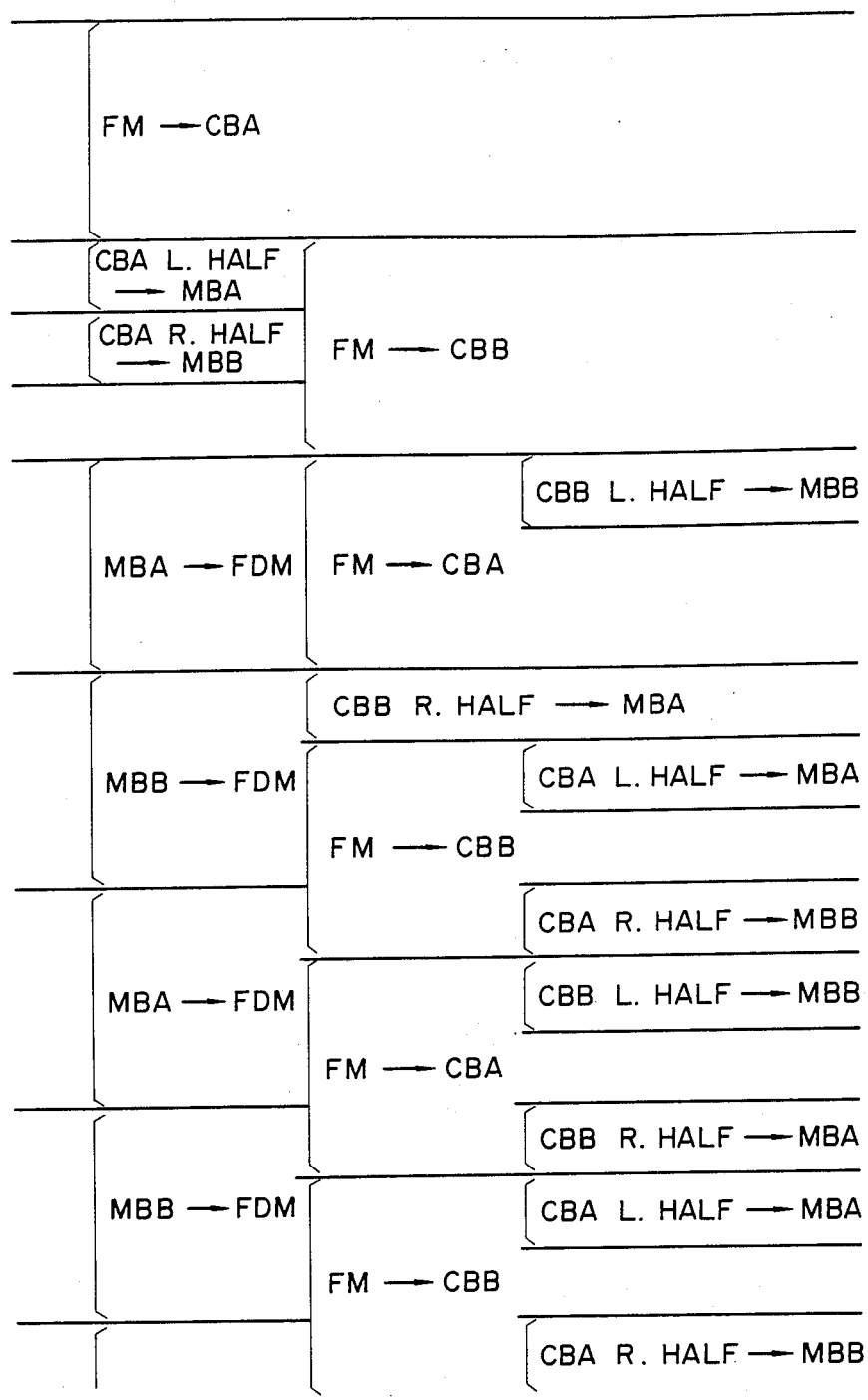
FIG. 7 shows a flow of processing.

FIG. 7 shows a flow of the character processing in the print processor 504 of FIG. 1. The process flows from the top to the bottom of FIG. 7 with time. Laterally parallelly shown steps are executed in parallel. Acronyms shown in FIG. 7 are identical to those shown in FIG. 1. In the present process, each character is longitudinally and laterally double-expanded and it is written into the full-dot memory with each character bridging across the boundary of words in the full dot memory.

First, data is moved from the font memory FM to the character buffer CBA. Then, the left half of the character buffer CBA is moved to the merge buffer MBA and the right half is moved to the merge buffer MBB. In parallel thereto, data is moved from the font memory FM to the character buffer CBB. Since the merge buffer MBA is now completed, it is written into the full-dot memory FDM. Since the character buffer CBA is now empty, the next character is moved from the font memory FM to the character buffer CBA. Since the loading into the character buffer CBB has been completed, the left half of the character buffer CBB is moved to the merge buffer MBB. After the merge buffer MBA has been moved to the full-dot memory FDM, the right half of the character buffer CBB is moved to the merge buffer MBA, and the merge buffer MBB is moved to the full-dot memory FDM. Upon completion of movement of the right half of the character buffer CBB to the merge buffer MBA, the movement of the next character from the font memory FM to the character buffer CBB is started. The left half of the character buffer CBA is moved to the merge buffer MBA. Thus, the initial phase is completed and a steady phase is started.

As seen from FIG. 7, in the steady phase, reading from the font memory FM (center process flow) and writing to the full-dot memory FDM (left process flow) are continuously carried out. The performance of the process system is determined only by the performance of the font memory FM and the full-dot memory FDM.

Figure 8:
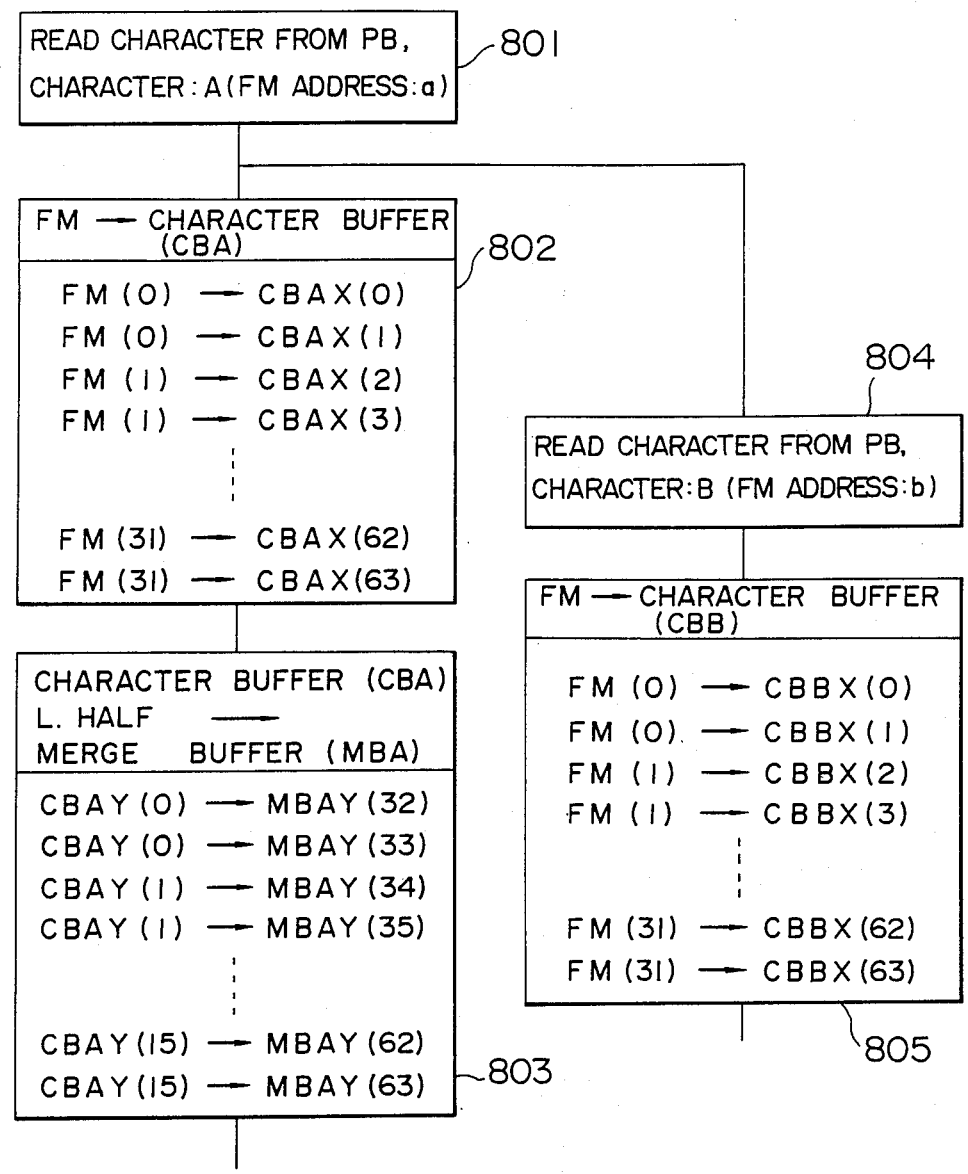
FIG. 8 shows an instruction sequence of a print processor of FIG. 1.
Figure 9:
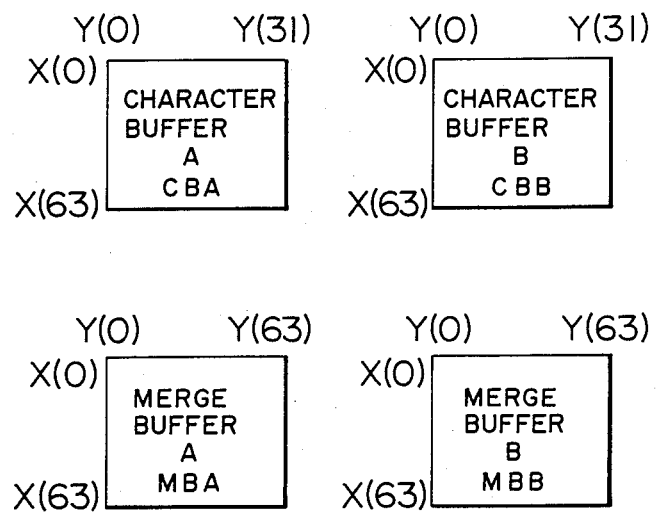
FIG. 9 illustrates a major portion of FIG. 8.

FIG. 8 shows an instruction sequence for the print processor of the embodiment of FIG. 6, and FIG. 9 explains buffers used in FIG. 8.

The longitudinal and lateral expansion and merging by the print processor PP are explained with reference to the instruction sequence of FIG. 8. The process shown in FIG. 8 is a start portion of the process shown in FIG. 7.

As shown in FIG. 9, the character buffer is a 32×64-bit matrix, and the merge buffer is a 64×64-bit matrix write and read accesses are done in crossing directions such as longitudinal and lateral directions. When a lateral word is to be accessed, it is designated as X, and when a longitudinal word is to be accessed, it is designated as Y. For example, address 16 of the lateral word of the character buffer CBA is designated by CBAX(16), and address 8 of the longitudinal word is designated by CBAY(8). The same designation is used for other buffers. The font memory FM has a 32-bit word length, and the full-dot memory FDM has a 64-bit word length.

At the top of the instruction sequence of FIG. 8, a character is read from the page buffer PB and it is detected that the character is "A" and the address of the font memory is "a" (step 801). Then, the data is longitudinally double-expanded and it is moved to the character buffer CBA (step 802). That is, address 0 of the font memory FM is moved to address 0 of lateral word of the character buffer CBA, and then address 0 is again written into the lateral address 1 of the character buffer CBA. For addresses 1 to 31, they are written in duplicate to addresses 2 to 63 of the character buffers CBA so that the character is longitudinally double-expanded.

In the right block of FIG. 8, the same process is carried out in parallel. A character is read from the page buffer PB and it is detected that the character is "B" and an address of the font memory is "b" (step 804). Then, the character "B" is moved from the font memory FM to the character buffer CBB (step 805).

Then, the left half of the character buffer CBA is moved to the right half of the merge buffer MBA with lateral double-expansion (step 803). This is done by longitudinal word. By using addresses 0 to 31 in duplicate, the longitudinal word of the character buffer CBA is double-expanded. Since the left half thereof is now processed, the addresses 0 to 15 are used twice and they are moved to the longitudinal addresses 32 to 64 of the merge buffer MBA.

The merge buffer MBA is thus completed. If it is to be merged with another character such as in a succeeding merge buffer, the data of the other character is stored in the addresses 0 to 31.

While not shown, when data is to be sent to the full-dot memory FDM, it is read from the merge buffers MBA and MBB sequentially, one lateral word at a time. For example, when the lateral address 0 of the merge buffer MBA is to be written into the address $(X_A, Y_A)$ of the full-dot memory FDM, the address 1 is address $(X_A, Y_{A+1})$, the address 2 is address $(X_A, Y_{A+2})$ and so on.

In the embodiment shown in FIG. 8, the longitudinal and lateral double-expansion is carried out. For another expansion factor, the read address and write address shown in FIG. 8 are changed. Duplicate information or elimination of information for each row and each column is provided for each character so that the size of the character is controlled. Thus, the expansion/reduction of a factor of a non-integer can be attained without degrading the shape of the character.

In the prior art system, the character expansion/reduction process and the merge process are carried out one raster at a time. Accordingly, the processing time is long and the microprogram for controlling the process is large. On the other hand, in accordance with the present invention, the expansion/reduction process and the merge process are carried out one longitudinal or lateral word of character at a time. Accordingly, the processing speed is improved. Since the character expansion/reduction circuit and merge circuit may be implemented by a common buffer circuit, the amount of hardware can be reduced and the size of the microprogram is also reduced.

In accordance with the embodiments described above, in the laser beam printer or display device, no shift circuit nor mask circuit is needed in the merge circuit which arranges the data read from the font memory to any position in the full-dot memory. Thus, the amount of hardware may be reduced. Since the complexity of merging is also reduced, the size of the microprogram needed to control the process is reduced and the overall performance of the system is improved.

In accordance with the embodiment shown in FIGS. 5 and 6, the character expansion/reduction circuit and the merge circuit may be implemented by one common circuit and the common circuit by itself is a buffer for the data read from the font memory therefore, the amount of hardware can be substantially reduced. Since the expand/reduce process and the merge process are carried out one word at a time, the size of the microprogram can be reduced and the processing speed improved. In this manner, the size of the hardware and the amount of microprogram are reduced and the overall performance of the system is improved.

I claim:

1. An information output device comprising:
   a font memory for storing character data;
   a full-dot memory for storing data read from the font memory through a buffer circuit at any desired position within the full-dot memory;
   said buffer circuit connected between said font memory and said full-dot memory, including at least one data buffer having a write word direction and a read word direction which are orthogonal to each other;
   a control unit coupled to said buffer circuit and having memory means for storing information to specify data to be read from said font memory and information to specify a manner of expansion/compression of the data to be stored in said full-dot memory and a position for storage therein, and controller means for controlling said buffer circuit to effect writing of data from said font memory into said buffer circuit and reading of data from said buffer circuit into said full-dot memory as dot-expanded or dot-compressed data in accordance with said expansion/compression information at a selected position in said full-dot memory by shifting the data read from said font memory by an amount determined by said position information during the writing of the data into said data buffer to position the data in said data buffer and reading said data from said data buffer into said full-dot memory while expanding or compressing the data; and
   information output means for reading and outputting the data stored in said full-dot memory;
   wherein the number of data buffers is at least two and the two data buffers are buffers having the same function and which operate alternately to store data from said font memory.

2. An information output device comprising:
   a font memory for storing character data;
   a full-dot memory for storing data read from the font memory through a buffer circuit at any desired position within the full-dot memory;
   said buffer circuit connected between said font memory and said full-dot memory, including at least one data buffer having a write word direction and a read word direction which are orthogonal to each other;
   a control unit coupled to said buffer circuit and having memory means for storing information to specify data to be read from said font memory and information to specify a manner of expansion/compression of the data to be stored in said full-dot memory and a position for storage therein, and controller means for controlling said buffer circuit to effect writing of data from said font memory into said buffer circuit and reading of data from said buffer circuit into said full-dot memory as dot-expanded or dot-compressed data in accordance with said expansion/compression information at a selected position in said full-dot memory by shifting the data read from said font memory by an amount determined by said position information during the writing of the data into said data buffer to position the data in said data buffer and reading said data from said data buffer into said full-dot memory while expanding or compressing the data; and information output means for reading and outputting the data stored in said full-dot memory;

wherein the number of data buffers is four and the four data buffers function as two character buffers having the same function which operate alternately and two merge buffers having the same function and which operate alternately, the character buffers each including means for storing data read from said font memory, and the merge buffers each including means for storing a desired amount of data from said character buffers at desired positions under the control of said control unit.

3. An information output device according to claim 2, wherein said font memory stores words extending laterally of characters and reads out words extending longitudinally of characters, said merge buffer writes words extending longitudinally of characters and reads out words extending laterally of characters, and said control unit shifts the data laterally of a character by a desired amount as the data is read from a character buffer and is written into a merge buffer.

4. An information output device according to claim 3, wherein said control unit controls said buffer circuit to expand or compress a character as data is written into said character buffer and said merge buffer.

5. An information output device comprising:

a font memory for storing character data;

a full-dot memory for storing data read from the font memory through a buffer circuit at any desired position within the full-dot memory;

said buffer circuit connected between said font memory and said full-dot memory, including at least one data buffer having a write word direction and a read word direction which are orthogonal to each other;

a control unit coupled to said buffer circuit and having memory means for storing information to specify data to be read from said font memory and information to specify a manner of expansion/compression of the data to be stored in said full-dot memory and a position for storage therein, and controller means for controlling said buffer circuit to effect writing of data from said font memory into said buffer circuit and reading of data from said buffer circuit into said full-dot memory as dot-expanded or dot-compressed data in accordance with said expansion/compression information at a selected position in said full-dot memory by shifting the data read from said font memory by an amount determined by said position information during the writing of the data into said data buffer to position the data in said data buffer and reading said data from said data buffer into said full-dot memory while expanding or compressing the data; and information output means for reading and outputting the data stored in said full-dot memory;

wherein two data buffers serving as a merge buffer and an alternative merge buffer operating alternately for storing a desired amount of data at desired positions therein are provided, said font memory stores words extending longitudinally of characters, said merge buffer writes words extending longitudinally of characters and reads words extending laterally of characters, and said control unit controls said buffer circuit to shift the data laterally of a character by a desired amount as the data is read from said font memory and written into said merge buffer.

6. An information output device according to claim 5, wherein said control unit controls said buffer circuit to expand or compress a character as data is written into said merge buffer and said full-dot memory.

* * * * *